United States Patent
Hendrey et al.

(10) Patent No.: US 6,539,232 B2
(45) Date of Patent: Mar. 25, 2003

(54) METHOD AND SYSTEM FOR CONNECTING MOBILE USERS BASED ON DEGREE OF SEPARATION

(75) Inventors: Geoffrey R. Hendrey, San Francisco, CA (US); Hirohisa A. Tanaka, Menlo Park, CA (US); Philip J. Koopman, Jr., Pittsburgh, PA (US); Joseph D. King, Hudson, NH (US)

(73) Assignee: Telcontar, San Jose, CA (US)

( * ) Notice: Subject to any disclaimer, the term of this patent is extended or adjusted under 35 U.S.C. 154(b) by 0 days.

(21) Appl. No.: 09/876,153

(22) Filed: Jun. 8, 2001

(65) Prior Publication Data

US 2002/0086676 A1 Jul. 4, 2002

Related U.S. Application Data

(60) Provisional application No. 60/216,721, filed on Jul. 7, 2000, provisional application No. 60/214,197, filed on Jun. 26, 2000, provisional application No. 60/210,691, filed on Jun. 10, 2000, and provisional application No. 60/210,682, filed on Jun. 10, 2000.

(51) Int. Cl.[7] ............................ H04Q 7/20; H04M 3/42; H04B 5/00
(52) U.S. Cl. ........................... 455/456; 455/414; 455/41
(58) Field of Search .................................. 455/456, 404, 455/414, 445, 421, 423, 517, 519, 62.1, 41; 717/104

(56) References Cited

U.S. PATENT DOCUMENTS

| | | |
|---|---|---|
| 5,043,736 A | 8/1991 | Darnell et al. |
| 5,761,648 A | 6/1998 | Golden et al. |
| 5,774,802 A | 6/1998 | Tell et al. |
| 5,852,775 A | 12/1998 | Hidary |
| 5,873,040 A | 2/1999 | Dunn et al. |
| 5,884,272 A | 3/1999 | Walker et al. |
| 5,953,400 A | 9/1999 | Rosenthal et al. |
| 5,963,864 A | 10/1999 | O'Neil et al. |
| 5,974,393 A | 10/1999 | McCullough et al. |
| 5,982,281 A | 11/1999 | Layson, Jr. |
| 6,018,699 A | 1/2000 | Baron, Sr. et al. |
| 6,047,327 A | 4/2000 | Tso et al. |
| 6,052,122 A | 4/2000 | Sutcliffe et al. |
| 6,055,434 A | 4/2000 | Seraj |
| 6,060,995 A | 5/2000 | Wicks et al. |
| 6,061,561 A | 5/2000 | Alanara et al. |
| 6,061,681 A | 5/2000 | Collins |
| 6,067,045 A | 5/2000 | Castelloe et al. |
| 6,067,356 A | 5/2000 | Lautenschlager et al. |
| 6,073,138 A | 6/2000 | de l'Etraz et al. |
| 6,119,014 A | * 9/2000 | Alperovich et al. ......... 455/456 |
| 6,208,866 B1 | * 3/2001 | Rouhollahzadeh et al. . 455/456 |
| 6,292,672 B1 | * 9/2001 | Chavez, Jr. .................. 455/519 |
| 6,377,793 B1 | * 4/2002 | Jenkins ....................... 455/456 |
| 2001/0027111 A1 | * 10/2001 | Motegi et al. ............... 455/519 |

FOREIGN PATENT DOCUMENTS

| | | | | |
|---|---|---|---|---|
| WO | 97/41654 A1 | * 11/1997 | ................. | 455/456 |
| WO | 99/05597 A1 | * 2/1999 | ................. | 717/104 |
| WO | 99/33199 A1 | * 7/1999 | ................. | 455/456 |
| WO | 99/66757 A1 | * 12/1999 | ................. | 455/456 |
| WO | 00/22860 A1 | * 4/2000 | ................. | 455/456 |

* cited by examiner

*Primary Examiner*—Nay Maung
*Assistant Examiner*—Raymond Persino
(74) *Attorney, Agent, or Firm*—Fenwick & West LLP

(57) ABSTRACT

A method and system for selectively connecting proximately located telecommunications units are disclosed. The method and system may be used in a location aware telecommunications system that can determine the location of a telecommunications unit (TU) being used within the system. A first TU may be connected to a second TU when the first and second TUs are within a predetermined distance of each other and when a first user associated with the first TU may be connected to a second user associated with the second TU on a graph representing individual relationships, such as an acquaintance graph or genealogical tree. The connection may further be based on whether the first and second users have a less than a maximum threshold degree of separation within the relationship graph.

33 Claims, 10 Drawing Sheets

METHOD AND SYSTEM FOR CONNECTING MOBILE USERS BASED ON DEGREE OF SEPARATION

This application claims priority to provisional U.S. application Ser. No. 60/210,682, filed Jun. 10, 2000, provisional U.S. application Ser. No. 60/210,691, filed Jun. 10, 2000, provisional U.S. application Ser. No. 60/214,197, filed Jun. 26, 2000, and provisional U.S. application Ser. No. 60/216,721, filed Jul. 7, 2000, each of which is herein incorporated by reference.

FIELD OF THE INVENTION

The invention relates to mobile telecommunications systems. In particular, aspects of the invention relate to methods and systems for automatically and/or selectively initiating communications among mobile users in a telecommunications system that has the ability to determine a geographic location of mobile users.

BACKGROUND OF THE INVENTION

Mobile telecommunication units (MUs) such as cell phones and other related devices have become a pervasive part of our culture. Throughout the several years that MUs have been in widespread use, they have been treated largely as a movable version of a standard telephone. In particular, a main objective of current systems has been to hide the fact that the user of the MU is in fact mobile, by providing a standard telephone number for reaching the MU regardless of location. Thus, MUs are typically used in a manner so as to conceal the location of the mobile user to make it appear to the outside world that the unit is a traditional stationary unit (SU). Similarly, when telecommunication system users (users) place phone calls using MUs, they dial traditional telephone numbers as if they were in their home location, making call placement appear to users of MUs as if they were in their home cities, regardless of their actual location.

Of course the approximate location of an MU is always known to the telecommunication infrastructure in the form of which cell base station the MU is communicating with (e.g., as taught in U.S. Pat. No. 6,061,561 (Alanara et al.)). A prime motivation for being able to access such information is to determine the location of MU users who place calls to Emergency-911 call centers or are otherwise in distress. In order to improve the effectiveness of Emergency-911 services in particular, more accurate position information is being made available via the telecommunication infrastructure. For example, U.S. Pat. No. 6,067,045 (Castelloe et al.) teaches the use of combining Global Positioning System (GPS) information with a telecommunication infrastructure to accurately determine the position of an MU, whereas U.S. Pat. No. 6,055,434 (Seraj) teaches the use of low powered beacons scattered throughout MU usage areas. But, regardless of the technology used, the end result is that telecommunication systems are rapidly being provided with an ability to accurately determine the geographic location of an individual MU.

In conventional telecommunication systems, a telephone call is initiated by having one user dial a number to establish a connection with another user. Recent technology trends have evolved the notion of establishing a connection to become more sophisticated using, for example, a monitor of a stock price to send a paging message when there is a price change. However, these other ways of establishing connections do not take into account the location of the person either establishing the connection or the location of the person with whom the connection is being established.

These other ways of establishing connections also do not take into account the inter-relationships of people. For example, an acquaintance graph may be used to illustrate social connections between individuals. An example of a portion of an acquaintance graph is shown in FIG. 13. Nodes on the graph represent individuals and arcs indicate that the individuals are acquaintances, or that they have met one another.

The number of degrees of separation, or "hops" on a social acquaintance graph between two individuals, generally tends to be a small number. Put another way, if the network of friends and acquaintances of every person were drawn out into a single large acquaintance graph as a set of nodes (people) and arcs (personal relationships), it would not take very many arc traversals through the network to get from any one individual to another. This concept is often attributed to Samuel Morse, the inventor of the telegraph, in the form of the statement that there are only six degrees of separation between any two people. This notion was being exploited by the web site www.sixdegrees.com, before its demise on Dec. 31, 2000.

While the notion of degrees of separation freedom is frequently cast in the form of determining a minimum-hop path via an acquaintance graph for two predetermined people, it also has relevance in that for any randomly selected group of people it would seem likely that there are acquaintance graph paths shorter than length six present (i.e., while six hops tends to connect any two people, many people can be connected in fewer hops). In particular, if the group is selected based on common characteristics, interests, or geographic location, there may be short acquaintance graph paths that pass through shared clubs, alumni organizations, civic groups, or the like. However, acquaintance graphs are not presently being used to initiate connections between mobile users.

BRIEF SUMMARY OF THE INVENTION

In a first aspect of the invention, there is a method for initiating a telecommunications connection. The method includes the step of connecting a first telecommunications unit (TU) to a second TU when a predetermined criteria is met. The predetermined criteria includes the first and second TUs being within a predetermined distance of each other, and a first user associated with the first TU being connected to a second user associated with the second TU in a graph representing relationships among users.

In a second aspect of the invention, there is a computer readable medium for storing computer readable instructions that, when executed by a processor, cause a computing device to perform a set of steps for initiating a telecommunications connection. The set of steps includes the step of connecting a first telecommunications unit (TU) to a second TU when a predetermined criteria is met. The predetermined criteria includes the first and second TUs being within a predetermined distance of each other, and a first user associated with the first TU being connected to a second user associated with the second TU in a graph representing relationships among users.

In a third aspect of the invention, there is a system for initiating a telecommunications connection. The system includes a processor and memory for storing computer readable instructions that, when executed by the processor, cause the system to perform a set of steps. The set of steps includes the step of connecting a first telecommunications unit (TU) to a second TU when a predetermined criteria is met. The predetermined criteria includes the first and second TUs being within a predetermined distance of each other, and a first user associated with the first TU being connected to a second user associated with the second TU in a graph representing relationships among users.

In some embodiments, the first and second users are required to have less than a maximum threshold degree of separation within the graph.

In yet other embodiments, the predetermined distance may be responsive to the degree of separation between the first and second users.

In some embodiments, the graph is an acquaintance graph. In other embodiments, the graph is a genealogical tree. Each graph may be associated with a different maximum threshold degree of separation.

In some embodiments, attribute information associated with each user may be used to filter connections.

In some embodiments, the connection may be automatically initiated when the predetermined criteria is met. In other embodiments, the connection may be initiated responsive to a request by the first user.

In some embodiments, the connection may be suppressed when either user indicates that the TU associated with that user is unavailable for connections based on relationship graphs.

DEFINITIONS

Figure 1:
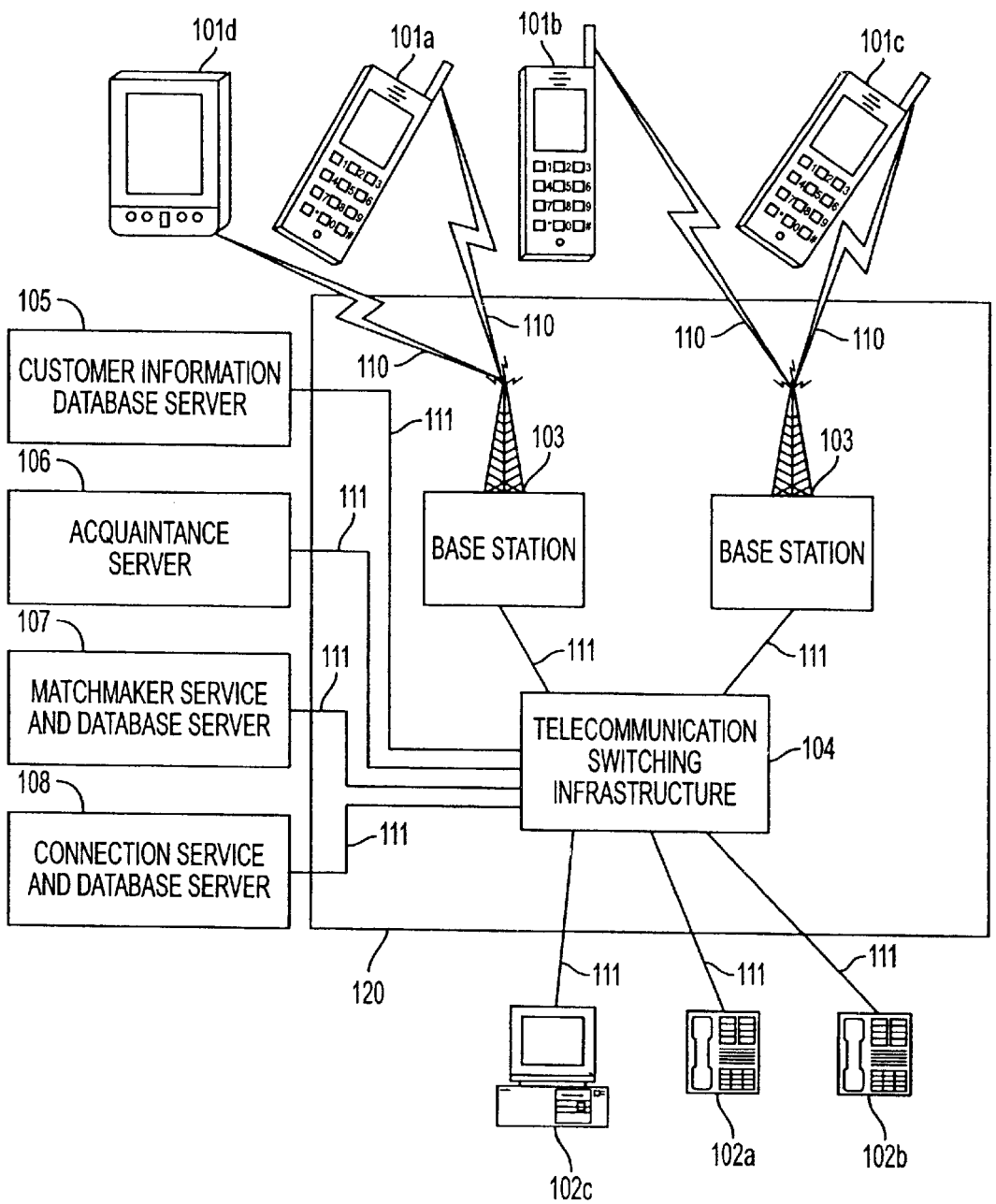
FIG. 1 illustrates a location-aware telecommunication system containing both mobile units and stationary units.

Acquaintance Graph: an undirected graph in which nodes are people (or fictional persons such as groups or corporations) and arcs are placed between nodes whenever the two people corresponding to the nodes being joined by an arc can be said to know each other (meaning that they are friends, acquaintances, relatives, business associates, etc.)

Connection: a data transfer path among a plurality of TUs. This data transfer path can be used for voice, data, or any other purpose known in the art. It may be a continuous, "circuit switched" connection or emulation thereof, or it may be a packetized or even one-time data transfer connection. A connection may encompass any and all modalities of data transfer between TUs. This includes, for example, voice phone calls, video phone calls, digital camera picture transfers, general multimedia data transfers, television feeds, movies, e-mail, voice mail, short message service ("SMS"), prerecorded messages, data to create synthesized/reconstructed voice messages, map information, geographic coordinate data, World Wide Web content and World Wide Web pointers. There are many types of data that can be transferred, and the term "connection" may apply to anything that can be transferred over a telecommunication system.

Call: any instantiation of a CONNECTION to a TU.

Callee: a TU that is added to a connection responsive to a caller having initiated creation of that connection, or responsive to an automatic instantiation of a connection between two or more callers.

Caller: a TU that requests creation of a connection.

Degree of Separation: the minimum number of arcs that must be traversed in a graph to get from one user (node) to another user (node).

MU (Mobile Unit): a mobile telecommunication transmitter, transceiver, or receiver capable of supporting a connection. Typically connected using wireless links. Examples include cell phones, pagers, wireless web browsers, personal digital assistants, and laptop/handheld/wearable computers.

SU (Stationary Unit): a non-mobile telecommunication transmitter, transceiver, or receiver capable of supporting a connection. Typically connected using wire or fiber links.

TU (Telecommunication Unit): a telecommunication transmitter, transceiver, or receiver that is generic, encompassing both MUs and SUs (i.e., a generic term when the distinction between MU or SU is irrelevant).

User: a generic term for caller, callee, or TU whether or not it is involved in a connection. A TU may be associated with a person (hence the term "user"), but may also be an automated system connected to the telecommunication infrastructure. Also, while descriptions generally refer to a "user" being a person or entity possessing a single TU, it is possible for one person or entity to possess multiple TUs, and for TUs to be associated with non-persons such as computers running automated software, vehicles, and the like. The term "user" is meant to be illustrative and not limiting.

The terms "telecommunication infrastructure" and "telecommunication system" and similar terms are to be interpreted as broadly as possible within the known art. In particular, such approaches to delivering telecommunication data include not only phones and phone-based systems such as POTS (plain old telephone service), but also to systems such as DSL (digital subscriber line), cable TV systems, and any and all data networks, even if established only within specific buildings or other areas. Similarly, a location aware telecommunications system refers to a telecommunications system that has location information available regardless of whether the information is available by being integrated into the telecommunication system or provided by some alternate means.

DETAILED DESCRIPTION OF THE INVENTION

The availability of position information with respect to MU users makes possible new concepts not previously available in telecommunication services. In particular, rather than the traditional approach of hiding location information, mobile telecommunication systems can exploit location information to adapt services responsive to the location of MU users.

Aspects of the invention may be embodied in various methods and systems. Aspects of the invention provide a method and system for initiating a connection between two or more proximately located mobile telecommunications users based on predefined criteria.

Referring to FIG. 1, aspects of the invention may be embodied in a telecommunications environment where a number of users make use of a location-aware telecommunication system 120. FIG. 1 shows a typical telecommunication infrastructure, with the specific additional capability that system 120 is able to determine the position of MUs 101a–101d using location determining technology known in the art, such as global positioning systems (GPS), time difference of arrival (TDOA), angle of arrival (AOA), and other like systems and methods. An additional capability that may be present in some embodiments of the invention is the ability to determine the location of SUs 102a and 102b, which may be accomplished for example via preexisting caller ID information, collating telephone listing street information corresponding to an SU 102 with a map database, or other location determining means.

System 120 may contain one or more instances of telecommunication switches 104, general-purpose telecommunication links 111 (fiber, wire, microwave, wireless, etc.), wireless telecommunication links 110, base stations 103 for wireless MUs 101, and SU telephones 102. Connected to system 120 may be a customer info database server 105, an acquaintance server 106, matchmaker service and database (matchmaker) 107, and a connection server 108, each for use with one or more embodiments of the invention, as disclosed herein. The customer information database 105, automatic connection initiation service 106, matchmaker 107 and connection server and database 108 may either be integrated into system 120 or may be operated independently, external from system 120. Additionally, it is possible to combine the functions of database server 105, server 106, matchmaker 107, and server 108 in one or more server, or they may each be maintained separately.

GROUP CONNECTION BASED ON DISTANCE

With reference to FIGS. 2–5, one aspect of the invention connects an initiating first telecommunication unit TU 201 with one or more other TUs, wherein the predetermined criteria by which the TUs selected for connection may be the distances between all such TUs eligible for a connection and the initiating TU. That is, TUs are selected to be added to the connection based on their physical proximity to the initiating TU.

Figure 2:
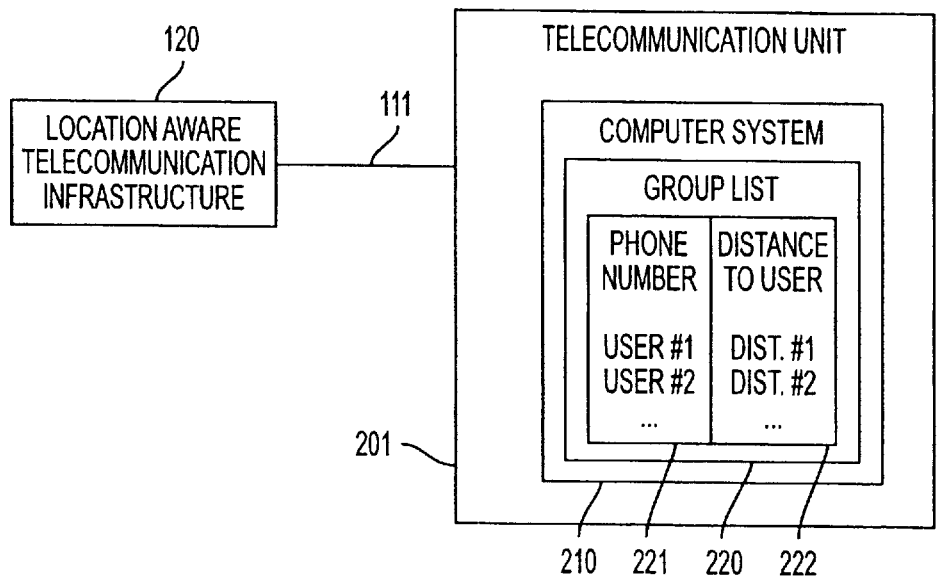
FIG. 2 illustrates a telecommunication transceiver which is capable of initiating connections selective to distance information.

One embodiment of this aspect of the invention is shown in FIG. 2. In this embodiment TU 201 contains a computer system 210 that selects callees based on a request from a user of the TU 201 to establish a connection. Computer system 210 has access to one or more group lists 220, with each group list 220 containing one or more phone numbers 221, with each distinct such phone number 221 corresponding to a different possible distinct callee within group list 220. A single callee may have multiple phone numbers and therefore may have multiple entries in group list 220.

The phone numbers 221 may be predetermined in this embodiment by being entered by the user of TU 201 during an optional one-time group list creation operation. In alternate embodiments, the telephone numbers 221 may be downloaded from an external information appliance such as a computer or a personal digital assistant (PDA), or received via the telecommunication infrastructure from some external source including, but not limited to, a designated maintainer of list information for a particular group.

Figure 4:
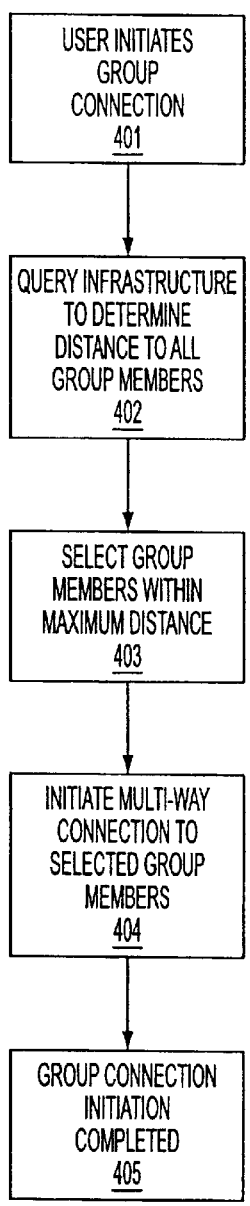
FIG. 4 illustrates a flow chart for establishing a group telecommunication connection responsive to a list of potential callees stored in a telecommunication unit.

A method for establishing a connection to one or more callees is shown in FIG. 4. In step 401, the user initiates a group connection, where a group includes at least one callee. In step 401, the user of TU 201 selects and activates a group list 220, when more than one are present in the TU 201, or the user may only activate a group connection feature if only one group list 220 is available. The user of TU 201 may also optionally select a predetermined maximum connection distance, or alternately use a default distance value associated either with that user's default choice or associated with the specific group list 220 being used. Other ways of selecting a distance measure may also be used.

Next, in step 402, TU 201 may query the communication infrastructure 120 via a communication link 111 to determine the distance between TU 201 and each potential callee in the selected group 220. The TU may perform the query by sending a list of phone numbers 221 and receiving distance values to place into distance entries 222 in group list 220. It should be noted that such distances 222 are time varying and thus should generally be obtained from infrastructure 120 relatively near to the time of placing a connection dependent on those distances. A predetermined amount of time may be used, beyond which the system may requery for new distance determination. It is also possible that the TU 201 may send the list of phone numbers 221 to the telecommunication infrastructure 120, and the telecommunication infrastructure determines the distances and initiates the telephone call, as described below, without further assistance from the TU 201.

In step 403, TU 201 may select users within group list 220 who meet a predetermined distance criterion, or the telecommunications infrastructure 120 may select the users who are within a predefined distance of the TU 201. The users 221 in this filtered list are used in step 404 as callees.

In step 404, TU 201 may initiate a multi-way connection via link 111 and communication infrastructure 120 to users satisfying the distance filtering criterion applied in step 403. If there are no such users, no connection is initiated and, preferably, the user of TU 201 is informed of failure to find suitable users for creating a group connection. If there is exactly one such callee, a connection is initiated to that one callee (a two-party connection). If there are a plurality of callees meeting the distance filtering criterion, then a conference connection may be initiated by TU 201 using techniques well known in the art. When the connection is successfully created for each party to the call, the connection initiation is completed in step 405. Alternatively, instead of the TU 201 initiating the connection(s), the telecommunications infrastructure 120 may initiate any two-party or group connections, connecting the TU 201 as it does any other user in the filtered list 221.

Alternatives to this embodiment may constitute desirable embodiments in a variety of alternate situations. The list of alternative embodiments is merely illustrative, as other alternatives may be readily apparent to those skilled in the art.

For instance, in step 403, the selection process for nearby callees might preferably select only up to a predetermined maximum number of nearby callees within the predefined maximum distance. Another alternative may be to select the closest predetermined number of users within the group, including the case of selecting only the closest user 221 on group list 220. Furthermore, steps 403 and 404 may be repeated until a predetermined number of callees successfully join a group conversation, with step 403 successively selecting callees within a greater predefined distance than the previous iteration.

As an example scenario, the user of TU 201 initiating the connection might wish to have lunch at a restaurant at a table for four people, and would use TU 201 to contact three members of group list 220 to go out to lunch. However, if one or more of the three closest members of group list 220 cannot be connected (or signifies a request not to join the lunch party by exiting the group conversation before its normal conclusion, before the initiating caller exits the conversation, or some other predefined criteria), steps 403 and 404 may be repeated to add additional callees to the connection until a desired number of callees is reached and stay in the multi-party conversation.

Also in step 403, the normal use of the term distance implies shortest geographic distance from one point to another. However, alternate embodiments may make use of additional geographic and transit information available to provide more practical calculations of distance when performing the selection process in step 403. One embodiment, where street map information may be exploited, reports distance in terms of actual travel distance. For example, taking into account walking around the perimeter of city blocks rather than diagonally through them, sometimes referred to as Manhattan Distance. An additional embodiment may use estimated ground travel time instead of distance to account for geographic features such as hills, public transit availability to speed progress in certain sections, or speed limits on roadways if users are separated by distances conducive to travel via vehicle. When traffic information is known, congestion on roadways may also be taken into account.

An additional embodiment may provide a refined process for selecting callees responsive to distance in step 403. For instance, if a maximum group size is desired that is less than the number of potential callees meeting the maximum distance criterion, the group may be selected so as to minimize the total spread of callees. This may be performed by minimizing the mean square distance of the selected callees from all potential callees within the group. Other techniques such as minimizing the mean distance or minimizing the maximum distance/travel time for any single callee to reach the caller may also be used.

Figure 3:
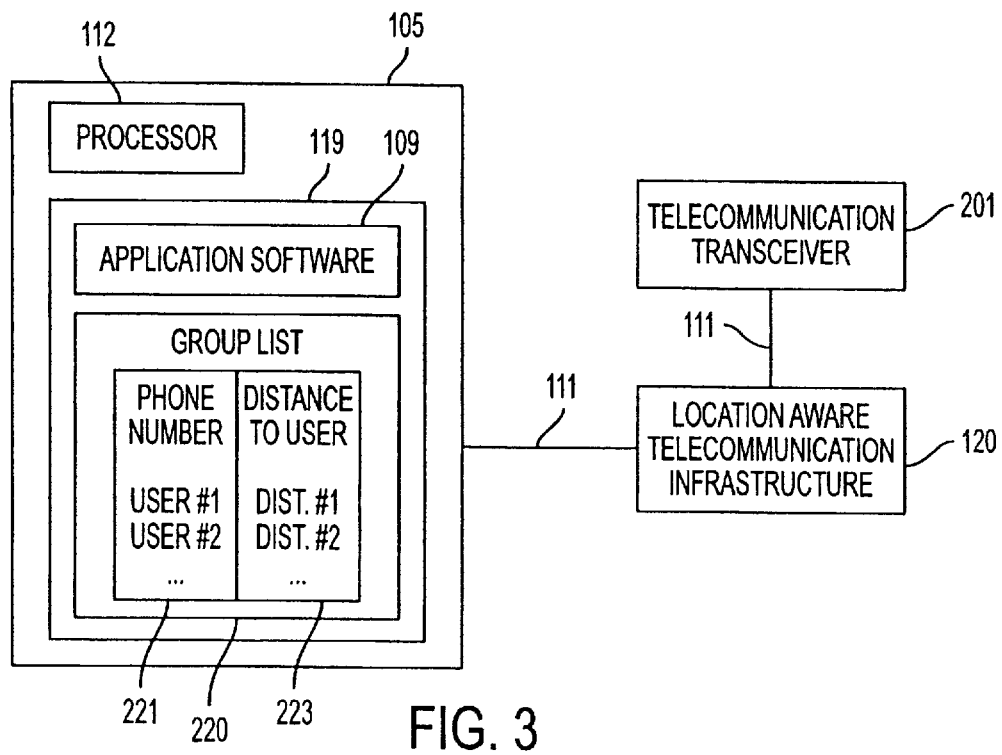
FIG. 3 illustrates a telecommunication infrastructure which has access to a customer information database that contains location information of various users.

Another preferred embodiment of the invention is described with further reference to FIG. 3. In this embodiment, a TU 201 is used to initiate a group connection via telecommunication infrastructure 120 that is connected to a customer information database server 105. In contrast to the first preferred embodiment in which TU 201 directed the creation of a connection, in this second embodiment a customer information database server 105 directs the creation of the connection, offering the advantage of permitting TU 201 to be "dumb" in the sense that it need not be specially modified or programmed to deal with group lists.

Customer information database server 105 may be centrally located, or it may be maintained in a distributed manner, as is known in the art. Server 105 comprises processor 112, and memory 119. Memory 119 stores group list database 220 and application software 109.

Figure 5:
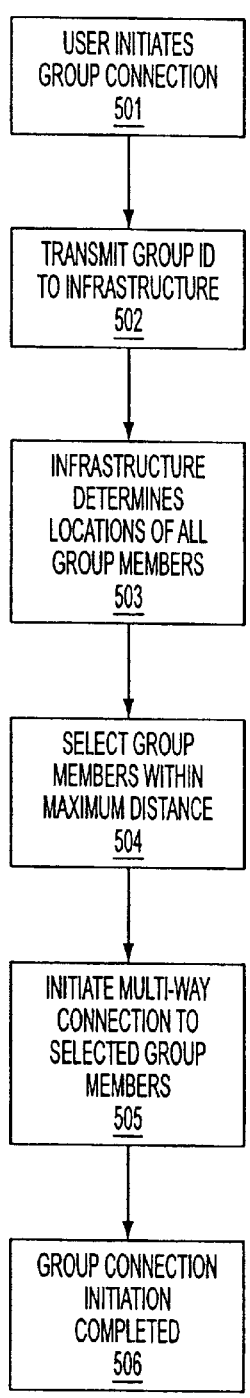
FIG. 5 illustrates a flow chart for establishing a group telecommunication connection responsive to a list of potential callees stored in a database within a telecommunications infrastructure.

Connections in this embodiment are initiated in step 501 of FIG. 5. In step 502, TU 201 may transmits a group identifier to customer information database 105 to select a predetermined group list 220 to use in establishing the connection. As in the embodiment described above, the group list may be created and selected in a variety of ways. The TU may identify the group list by entering a special numeric group code key sequence using a keypad affixed to TU 201 in lieu of dialing a single telephone number when creating the connection. Those skilled in the art may easily envision other ways to select a specific group list.

In step 503 the infrastructure determines the locations 223 of all group members and stores them locally in group list 220 in customer information database 105. Group list 220 may be continually kept up to date with location information 223 so that this step may be skipped as already having been performed prior to the user initiating a connection in step 501.

In steps 504, 505, and 506 group members are selected and a connection is initiated in a manner similar to that in steps 403, 404, and 405 of the embodiment described above, with the principal difference that location information 223 must be processed into distance information according to the various methods described in the above embodiment prior to being used for selection.

In one embodiment, the particular group list 220 is specified to the customer information database 105 by the TU 201 initiating the group connection by selecting a specific unique telephone number assigned as an identification number to the selected group. The telephone number acts as a proxy group ID number. Using this number does not automatically connect all members of the group, but it may in an alternative embodiment. Instead, dialing the telephone number invokes a selection process to connect a subset of members responsive to location information as described above. Alternatively, a single telephone number might be used to indicate that any group connection is desired, and a subsequent group code may be entered to identify the specific group.

It should be appreciated by those skilled in the art that the initiating TU 201 can be either an MU or an SU, and that any phone number in a group list 220 can correspond to an MU or an SU. Thus it is possible for all members of a group to be SUs, or all members of a group to be MUs, or any combination of SUs and/or MUs.

Among the many benefits of the above aspects of the invention is the ability to flexibly select a group of callees in a telecommunication system responsive to both membership in a predetermined group and distance among group members. This benefit enables creating ad hoc physical meetings and social occasions based on which individuals happens to be close together at any given time. Notions of distance are in particular intended to encompass not only literal distance measure, but additionally any and all measures conducive to identifying a set of users who would have the least difficult separation to overcome in order to attend a physical group meeting, among other uses.

CONNECTION BASED ON COMPATIBLE ATTRIBUTES

Figure 7:
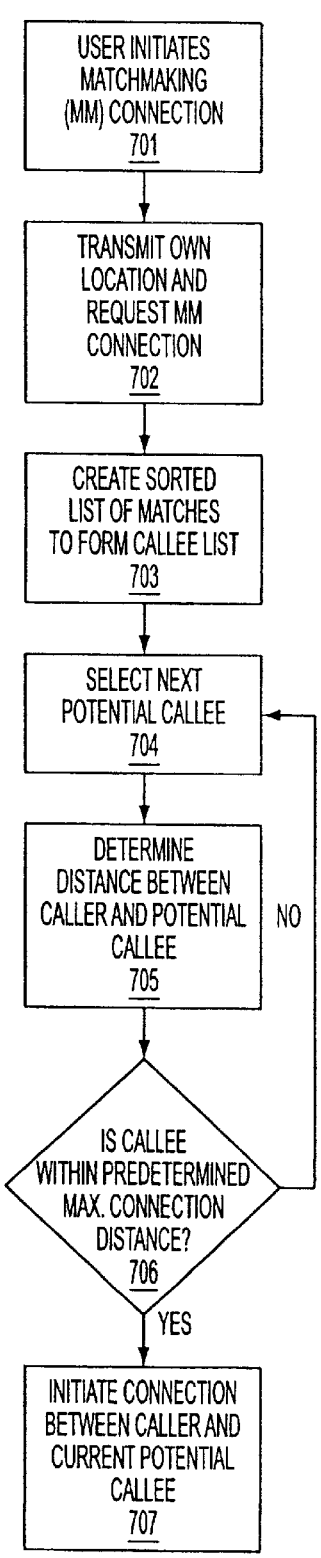
FIG. 7 illustrates a flow chart for establishing a telecommunication connection responsive to attribute profile information and distance information.
Figure 6:
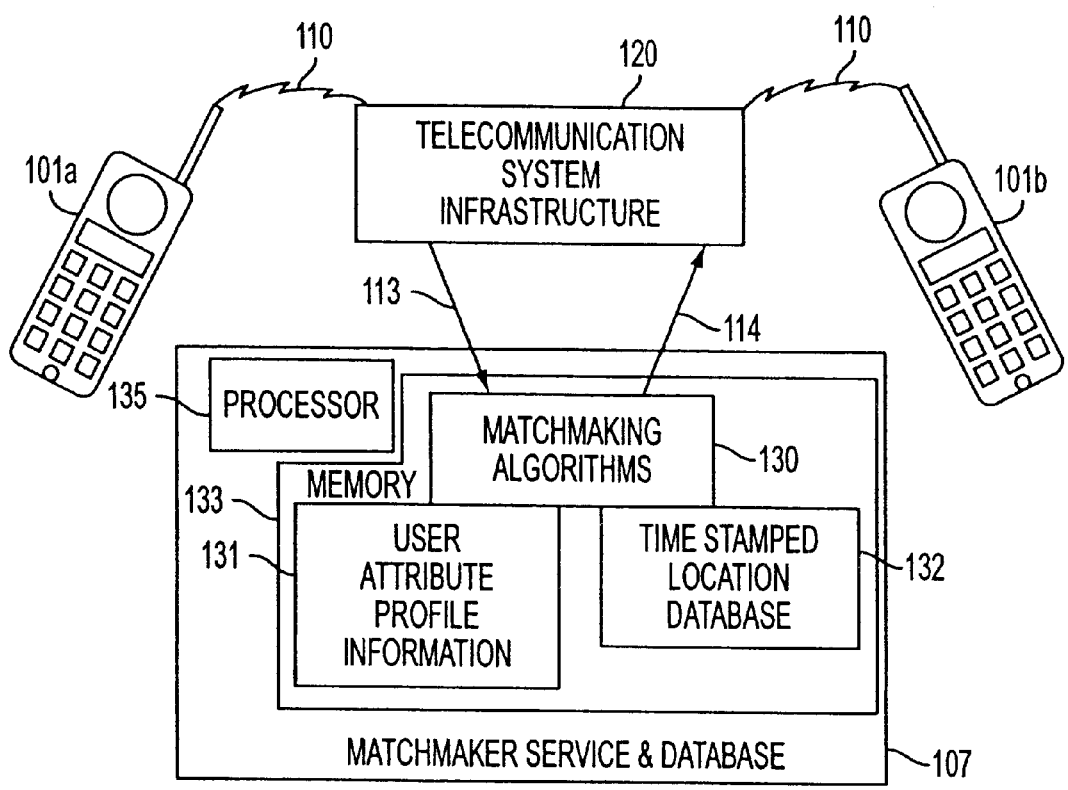
FIG. 6 illustrates a simplified telecommunication system and includes details of a matchmaker apparatus.

With reference to FIGS. 6–7, another aspect of the invention connects proximately located telecommunications users based in part on distance and in part on a profile associated with each user. In FIG. 6, a first MU 101a may be connected via the telecommunication infrastructure 120 to the matchmaker service & database 107 (hereinafter referred to as "matchmaker"). Infrastructure 120 sends location information about the first MU 101a to the matchmaker 107 along telecommunication link 113, as well the first MU's matchmaking connection request. Information about the locations of other MUs, such as MU 101b may additionally be sent to matchmaker 107 on link 113 as requested and/or as appropriate to the selection algorithm. In one embodiment, matchmaker 107 iteratively requests location information for specific other MUs. Matchmaker 107 further may send a request to establish connections among a plurality of selected MUs 101 via a request for connection on link 114.

The matchmaker 107 includes a processor 135 and memory 133. The memory 133 may store matchmaking algorithm(s) 130, user attribute profile information 131, and time-stamped location database 132. Matchmaking algorithm 130 may use the other components 131 and 132 to search for a suitable match to the user of the first MU 101a. The user attribute profile information database 131 may contain information about likes, dislikes, physical attributes, social attributes, and any other information desirable for creating matches for all registered users of the matchmaking service implemented including the user of the first MU 101a. Users may register for use of matchmaker 107 and provide attribute profile information during a sign-up process and optionally in maintenance processes using, for example, web-based tools as would be obvious to one skilled in the art. The current distance information database 132 may generate distance information between any two registered users, and may be implemented as a database of locations plus an algorithm to compute distance between any two locations. This implementation takes less storage space than an exhaustive enumeration of all distances for all pairs of registered users.

It should be appreciated that current distance database may be the same database as, a copy of, or in communication with, the location information in customer information database 105.

A method for performing a matchmaking connection is shown in FIG. 7. First, in step 701, a user desiring to initiate a matchmaking connection preferably activates a matchmaking feature on his/her MU 101a. Alternately, a predetermined matchmaking service telephone number can be used instead to perform activation, especially on older MUs not having a special-purpose matchmaking feature. Other ways of initiating a matchmaking connection will be readily apparent to those skilled in the art.

In step 702, the initiator's MU 101a transmits a request for matchmaking via a wireless link 110, through telecommunication system infrastructure 120, and via path 113 to matchmaker 107. In one embodiment a standard caller ID feature as known in the art may be used to identify the initiating MU 101a, and the telecommunication system infrastructure 120 may provide position information corresponding to the initiator. Thus the transmission of location information in step 702 may be implicit with the request rather than explicit in a message originated by MU 101. That is, the infrastructure 120 may provide location information using network based methods, such as TDOA, AOA, or other method known in the art, or the MU 101 may provide the location using a "smart" technology, such as GPS.

Next, in step 703, matchmaker 107 accesses user attribute profile information 131 and creates a list of the best matches between the initiator and other users who have registered with the matchmaker 107. This list may be sorted in order of best match first for later processing, or may be sorted by proximate distance of possible matches. The list may be implemented using any data structure known in the art, such as a linked list, sorted data array, heapsort data structure, and the like. In one embodiment the algorithm used for determining which matches are best creates a match score equal to the number of different attributes that are compatible between user profiles. For example, a male chess player seeking a female would have a score of one for any female, but a score of two for any female who also plays chess. Tied scores may be ordered randomly, but may alternately be ranked or weighted using different weights associated with each attribute, or tied scores may be ordered in increasing distance from the requesting MU. The art in the area of matchmaking is well developed, and this embodiment is not intended to limit or otherwise constrain the breadth of this invention to any single implementation or class of matchmaking algorithm.

Next, in step 704, matchmaker 107 begins an iterative search algorithm comprising steps 704–706. Step 704 processes the ordered set of matches from step 703 in decreasing order of score, initially selecting the first user from the list created in step 703. Step 705 determines the distance between the caller and the potential match selected in the current iteration of step 704. This distance is preferably determined by querying telecommunication system infrastructure 120 for the distance between initiating MU 101a and the specific potential callee MU being considered in the current search iteration. In step 706 the loop is terminated when the callee is identified as being within a predetermined maximum connection distance, causing control to pass to step 707 with a successful match; otherwise the search iterates back to step 704, selecting the next potential match from the list created in step 703. If no match is found, an exception has occurred and the process may terminate without establishing a connection, but preferably by notifying the initiating user of the error condition.

A suitable and proximate match callee having been identified, step 707 initiates a telecommunication connection between caller and selected callee MU 101b. In one embodiment, no personal information should be disclosed to either party so as to maintain protective anonymity until both parties are comfortable revealing information at their own discretion after a discussion period. Thus the connection is made "blind" between two or more parties who have no way of knowing the identity of other parties. This may be accomplished by blocking any Caller ID feature available on either users' phone, or by indicating a Caller ID of "MatchMaker" or some other identifying symbol or message.

After the connection has been successfully initiated, the call proceeds as a normal telecommunication connection with the exception of identification information being kept anonymous during the course of the connection and additionally in the billing cycle. That is, while some telecommunications carriers indicate the telephone number of every telephone call that a user makes in each periodic account statement, the identifying telephone number of the callee from the matchmaker connection may be suppressed, replaced with * symbols, replaced with a generic matchmaker telephone number, indication, or the like.

There are a variety of possible attributes that can be used to create matches. The following list of possible attributes is provided as an illustration of possible attributes that may be used to match one user with another. However, the invention is not intended to be limited to this or any other particular list of attributes, and applies to any and all such attributes that might be envisioned by one of skill in the art.

Name. A shared first name, surname, nickname, or other appellation can serve as the basis for conversion, whether or not it is indicative of a familial relationship.

Heritage. Persons belonging to the same extended family might wish to have an ad hoc meeting, especially if they do not live in the same household and, in fact, especially if they have never previously met. As an example, a traveler might encounter an unknown relative in a distant city.

Educational institution. Alumni of an educational institution (school, college, university, trade school, etc.) may wish to meet, and might additionally wish selection to be responsive to class year, major, courses taken, etc. Such a match can serve as an ad hoc alumni meeting opportunity.

Educational parenting. Parents, guardians, siblings, and other friends and relatives of a student in a particular school might wish to meet to share compatible interests and/or concerns.

Occupation. Individuals sharing a particular occupation, trade, or profession might wish to meet to discuss compatible interests.

Trade/Skill. Individuals having a particular skill, ability, or professional certification whether or not related to occupation might wish to meet. For example, two notary publics might wish to meet even though that certification is incidental to their primary employment, meaning that they do not have a shared primary occupation.

Military service. Shared military experiences including branch of service, group, specialty area, operating unit, or battles/time periods can form an excellent basis for discussion.

Hometown. Having grown up in or being the resident of or citizen of the same town, city, state, or country can provide a compatible basis for discussion. For example, a traveler to a distant country might welcome the opportunity to meet a person with a similar cultural heritage.

Religion. Having the same or compatible religions can form the basis of a discussion either on religious views or simply set a context for other compatible attributes.

Hobby. Hobbyists with similar avocations might wish to meet and discuss compatible interests.

Recent experience. A shared recent experience such as having read a book or having attended a concert can form the basis of a discussion.

Political views. People sharing political views might wish to discuss current events or political contests.

Problem or illness (ad hoc support group). People sharing compatible problems, illnesses, addictions, or behavioral disorders commonly seek companionship and support in support groups. Selecting callees responsive to shared problems or illnesses can create ad hoc support meetings. In particular, a person feeling in emergent need of such support might make a specific request to identify nearby sympathetic/compatible individuals for an immediate meeting.

Sexual preference, such as "heterosexual" or "homosexual", with selection performed responsive to both orientation and gender of potential callees.

Desire for a specific experience. This may encompass any experience, but examples might include looking for a companion to go to the movies or to try a specific restaurant.

Compatible demographics. This encompasses personal information such as age, gender, socioeconomic group, and so on.

There are a number of alternatives to the above aspect that may constitute desirable embodiments in a variety of alternate situations. This list of alternative embodiments should be considered merely illustrative, and is not intended to limit the scope of the invention.

The selection algorithm comprising steps 703–706 may be recast in a number of ways depending on information available and the type of selection desired. The invention may use any matchmaking process responsive to both attributes and distance. As a first example, potential matches could alternately be sorted by distance and then selected in distance order responsive to meeting a minimum match score. Alternately, a hybrid search may be performed wherein complete location and match information for all pairs of users is obtained prior to a search for a global optimum on a weighted match/distance score with, for example, a weighting value being set for each meter of distance balancing out each fractional number of match score points. Matchmaking algorithms may also combine both user attribute information and time-stamped location information in a single algorithm, such as a K-D Tree, which can efficiently produce a result set bounding dimensions including distance and attribute information.

The selection process of step 703 can alternately be responsive to predetermined times of day during which individual users have elected to be available or unavailable for matchmaking connections. Alternately, in a further embodiment, each MU 101 has the capability to set a mode of "responsive" or "unresponsive" to matchmaking connections to avoid connections wasted to callees who are not available for matchmaking discussions, similar to turning off a cell phone when one does not want to be disturbed, but applying only to matchmaking connections.

Distance information in step 705 is preferably obtained only as required during searches to minimize cost and resources used in obtaining distance information, but alternately could be maintained at all times for faster response time, or obtained from a cache subject to timeout and refresh intervals.

In a further embodiment, the caller may have the ability to specify a particular number of people to connect with rather than a single callee. Thus, for example, a person hoping to gather a group of three people could find two companions at once instead of having to make two matchmaking connections. The present invention may thus be used to dynamically generate group lists for initiating group connections pursuant to the first aspect of the invention, above. By this, what is meant is that steps 701 through 706 produce an ad hoc, dynamically generated group list, and step 707 consists of employing one of the many embodiments above with respect to the first aspect of the invention where proximately located mobile users are selectively connected in response to a group connection request.

In one embodiment the matchmaker 107 may be automated. However, in alternate embodiments matchmaker 107 may be partially or entirely a person using a telecommunication device and having access to distance information provided by telecommunication infrastructure 120.

Among the many benefits of this aspect of the invention is the flexible ability to select a group of callees in a telecommunication system responsive to both attribute profile information and distance among group members. This benefit enables creating ad hoc physical meetings and social occasions based on individuals that happen to be close together at any given time. Notions of distance are in particular intended to encompass not only literal distance measure, but additionally any and all measures conducive to identifying a set of users who would have the least difficult separation to overcome in order to attend a physical group meeting, among other uses. An additional benefit is to produce a result set of manageable size, when traditional attribute information produces large result sets.

This invention encompasses and broadens the notion of a traditional matchmaking service. In particular, the word "compatible" indicates something that is shared (e.g., a common love of the opera), is complementary (e.g., boy seeks girl or girl seeks boy), or is otherwise predictive of fostering a positive relationship (e.g., the proverbial Mr. & Mrs. Spratt who, having markedly differing preferences for amount of lipids in their food, are able to consume an entire meal in tandem while leaving no wastage). Those skilled in the art may readily envision unlimited attribute possibilities that may be used, in addition to distance, to match up two or more potentially compatible users.

AUTOMATIC CONNECTION BASED ON DISTANCE

Figure 8:
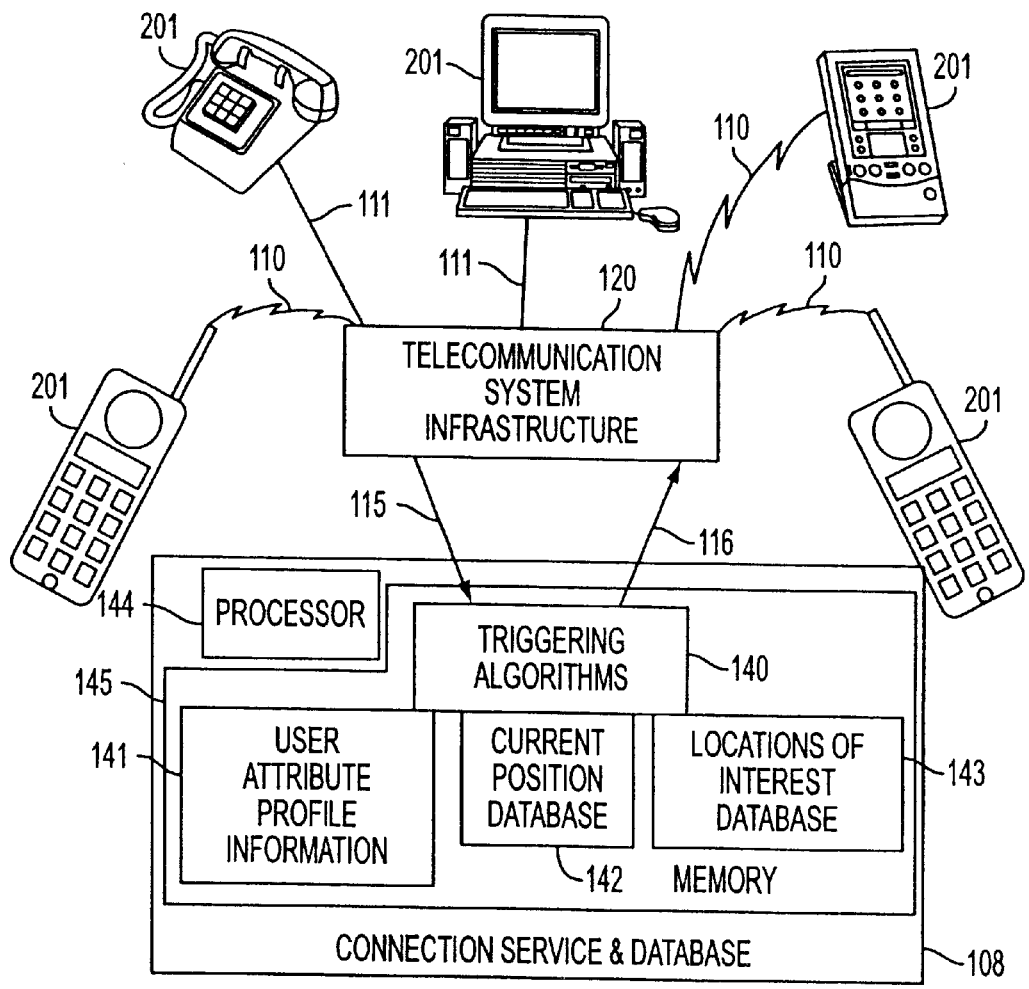
FIG. 8 illustrates telecommunication transceivers, telecommunication infrastructure, and components of a connection creation service.
Figure 9:
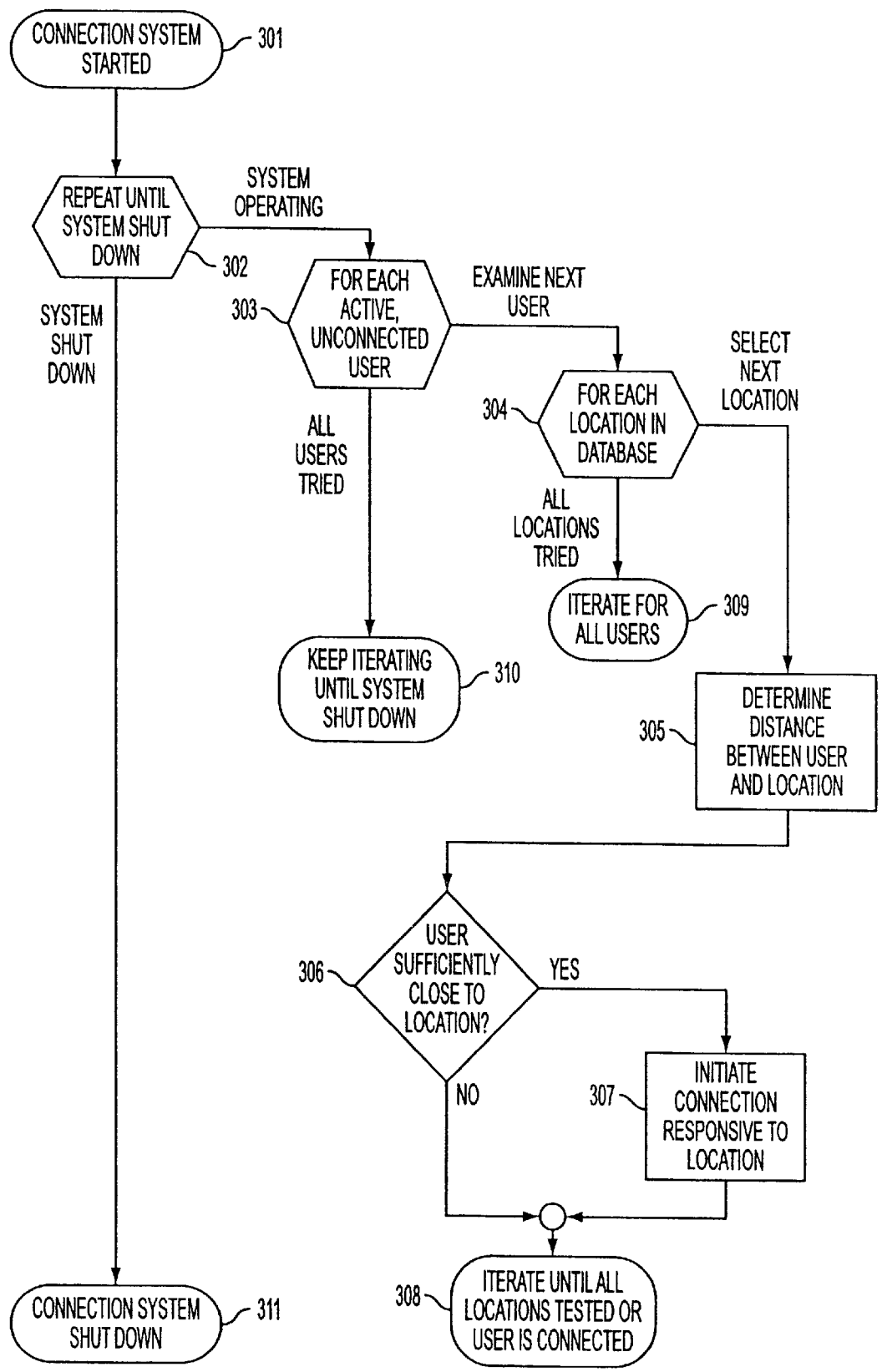
FIG. 9 illustrates a flow chart for a method of establishing a telecommunication connection responsive to a user being in a specific location.
Figure 10:
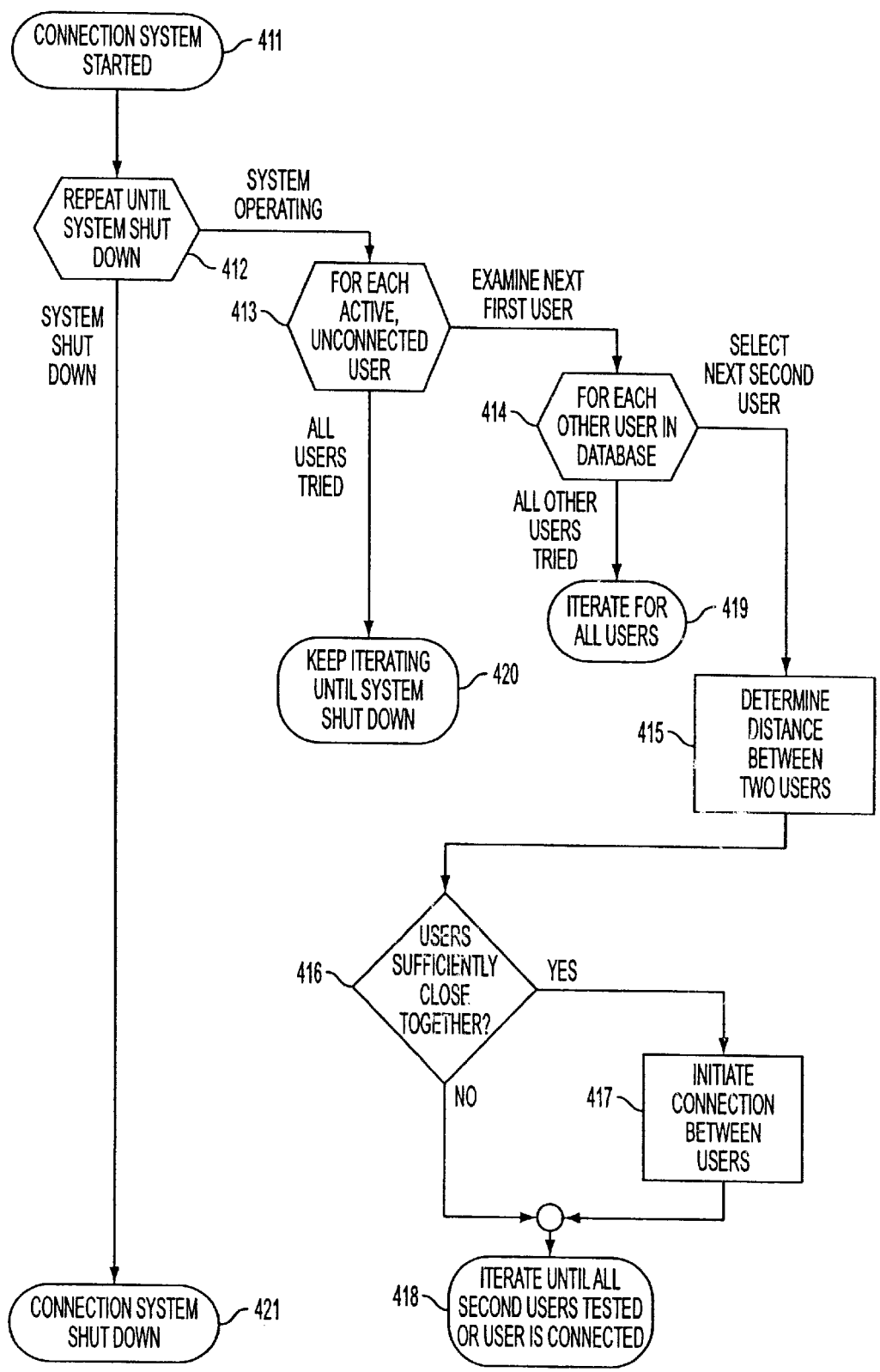
FIG. 10 illustrates a flow chart for a method of establishing a telecommunication connection responsive to the distance between two users.

In another aspect of the invention, with reference to FIGS. 8–10, a telecommunications system may continually monitor the location of TUs 201 and automatically initiate telecommunication connections between a first TU with one or more other TUs responsive to the distances between all such TUs eligible for a connection with the initiating TU. The example discussed below uses a pair of TUs being connected in order to clearly describe the invention, but aspects of the invention may also be used for connections among any number of TUs.

One embodiment of the invention is shown in FIG. 8. Currently active TUs 201a–201e are connected via infrastructure 120 to the connection server 108. An active TU is one that is both turned on and enabled by the user to participate in automated connections. Infrastructure 120 continually sends location information about TUs 201 to server 108 along telecommunication link 115. Infrastructure 120 may also send location information periodically, randomly, asynchronously, according to a regular schedule, or responsive to requests. Whenever criteria are met to trigger an automatically initiated connection, server 108 sends a request to establish connections among a plurality of selected TUs 201 via a request for connection on link 116. Logical links 115 and 116 may share a single physical telecommunication link as would be obvious to one skilled in the art.

The server 108 comprises a processor 144 and memory 145. Memory 145 stores at least one triggering algorithm 140 that uses other components in the memory of server 108 to determine when to initiate a connection and which TUs should participate in that connection. One embodiment of triggering algorithm 140 may be according to the method shown in FIG. 9. A user attribute profile information database 141 may contain information about likes, dislikes, physical attributes, social attributes, and any other information desirable for filtering triggering events. This profile information may be the same as or different from a user's matchmaking profile, above. Users may register for use of server 108 and provide attribute profile information in a sign-up process and optionally in maintenance processes using, for example, Web-based tools as would be obvious to one skilled in the art. A current position information database 142 contains position information for active TUs 201, and preferably is continually updated, although updates may occur only periodically based on economic factors, business and/or user needs, or similar criteria. A locations of interest database 143 contains position information for predetermined locations that may be of interest for triggering automatic connections. For example, location database 143 may have an entry for the front entrance of a particular store, building, or vendor cart location. Server 108 may comprise a conventional computer, mainframe computer, or other suitable computer device for the purpose of implementing triggering algorithms 140, storing user attribute profile information 141, storing current location database information 142, and storing location information 143 and generally performing procedures described herein.

A process for automatically initiating a connection for is shown in FIG. 9. In this embodiment, the distance between the user of a TU 201 and a predetermined location in database 133 may be used as a primary triggering criterion for establishing a telecommunication connection.

First, in step 301, server 108 is activated, and begins a continuous search for candidates for automatic connections in step 302, continuing until the server is shut down, deactivated or otherwise made unavailable in step 311.

The loop in step 303 examines each active user who is not already party to a connection, and in step 310 starts back at the first active user to reexamine them all over again per loop step 302.

The loop in step 304 takes a selected user and examines the distance between that selected user and all locations of interest to that user. Step 309 selects the next active user and continues executing loop 303.

Steps 305 to 308 perform the determination and connection operations of the automatic connection algorithm, with other steps serving largely to iterate across all users and all locations. Step 305 considers the current TU user's position, as received from database 142, and examines the distance between that TU and the position in database 143 for the particular location selected in iteration step 304. In step 306, the distance between the selected user and selected location is compared against a predetermined distance threshold (such as, for example, being within 20 meters). The predetermined distance threshold may be a default distance, a preferred distance defined by the user, or any other predetermined distance. If the distance of the user to the selected location is within the predetermined distance threshold, step 307 is executed to initiate a telecommunication connection between the selected user's TU and a predetermined callee associated in database 143 with that particular selected location. Regardless of whether a connection is initiated, step 308 iterates the loop controlled by step 304, either trying all locations in database 143 or stopping iteration once the user is connected. When the user is connected the system proceeds to perform iterations for other users.

As a result of the method shown in FIG. 9, a user coming within triggering distance to any of a set of locations stored in database 143 may receive a phone call or otherwise experience the automatic creation of a telecommunication connection with the callee associated with that location. In one embodiment a single connection is created, and further connections to a particular TU 201 are not made until the current connection of that particular TU 201 is completed. Also, in some embodiments the user of each TU 201 may select an operating mode which either enables or disables the automatic creation of connections. This allows users to suppress automatic connections when they may be inconvenient to the user, such as when the user is driving a car or waiting for an important telephone call.

In an enhanced operating mode further comprising the above embodiment, server 108 triggers connections not only responsive to distances to locations, but also responsive to a filtering function based on user attribute profile information. Any relevant user attribute is possible and within scope of the invention, including in general a user's preference for participating in a telecommunication connection for any particular type or genre of location. As an example, if a user likes to visit coffee shops then the user attribute profile information database 141 may be used by triggering algorithm 140 to trigger connections when near coffee shops listed in database 143. Alternatively, if a particular user does not care for coffee shops, an appropriate annotation in profile information 141 for that user would disable connections that would otherwise be triggered when near coffee shops. In one embodiment, step 306 not only determines whether a user is close to a particular location, but also whether that particular user meets screening criteria responsive to that user's profile information stored in profile information 141; and triggering algorithm 140 only initiates a connection per step 307 if both position and screening criteria indicate it is acceptable to do so. User profile information database 141 may be the same as or different from the user profile database 131.

It is additionally instructive to consider some usage scenarios to better understand embodiments of the invention. An aspect of the invention not present in prior art is the notion that connections occur in reaction to an automated triggering system rather than occurring at the specific request of a TU user (i.e., connections occur responsive to actions of server 108 rather than from a TU user dialing a phone number, entering a URL, or otherwise making a request of an information system). One of the modes of operation may be to create unexpected connections in that the user would not ordinarily be aware of a situation favorable for triggering a connection without the availability of server 108 and would not ordinarily initiate a connection manually.

It is possible that any particular instantiation of the described embodiments will be employed in one or more of the following manners, although this list should be considered merely illustrative and not limiting in any manner. Example scenarios of usage include:

Scenario 1: Database 143 contains locations of particular types of restaurants, coffee shops, snack shops, or other business, and profile information 141 contains user preferences for certain styles of products. A connection between a user's MU and a restaurant's marketing staff (automated or human) is created when a user walks within 50 feet of the restaurant's location. Optionally, this connection can be used to offer inducements to visit a shop or business along the lines of "e-coupons" that are issued responsive to proximity in addition to other information. The "e-coupons" may be embedded in a data message sent to the user's MU.

Scenario 2: Database 143 contains locations of historical, cultural, or other importance, and user profile information in database 141 indicates preferences of specific users to learn about specific types of locations and/or information. Thus, a user would get a phone call via MU when within a predefined distance of an important location of specific interest to that user.

Scenario 3: Database 143 and profile information 141, when combined, form a list of places that a user has specifically desired to see when convenient to do so, including for example a social obligation such as when a user has previously promised someone that they would stop by the next time he or she is in the neighborhood. Rather than having to remember all such obligations, a user can receive an automatic reminder phone call when within a predetermined distance of a previously promised social obligation location.

Scenario 4: Profile information 141 preferably also includes time-related information, such as when a particular user eats lunch. Thus, a user could be alerted by receiving a mobile telephone or automotive PC alert when driving past a Japanese restaurant within 15 minutes (or some other predefined amount of time) of lunchtime (also user or pre-defined). Information transmitted in this manner could include, for example, daily specials and prices in addition to the fact that such a restaurant is nearby.

Of course it would be obvious to one skilled in the art to create various alternative scenarios embodying the above aspect of the invention.

There are a number of alternatives to the above embodiments that may constitute desirable embodiments in a variety of alternate situations. This list of alternative embodiments should be considered merely illustrative, and is not intended to limit the scope of the invention.

In some situations the use of a "call waiting" feature might be desirable so as not to miss connections, permitting more than one connection to be initiated at a time. Modifying the operation of FIG. 9 to accomplish this is straightforward for one skilled in the art.

Some embodiments may keep history information regarding previously established connections, and adapt triggering algorithm 140 to take into account this information as an additional portion of profile information 141. For example, historical notes about a location passed by every day during a commute to work may be automatically filtered out without requiring a user to specifically exclude that particular location from triggering future matches after the initial connection instance.

The notion of distance in step 305 need not be considered to be simply geographic distance, but instead may encompass distance as defined throughout this specification.

While the foregoing describes a single server 108, it may be advantageous to have a plurality of such servers implemented both for competitive purposes as well as to distribute the server to various geographic regions, providing localized service infrastructure to each locality. Such servers may be centrally located physically and logically divided into regional service areas to take advantage of economies of scale in machine room operations. In particular, segmenting server 108 geographically may reduce the number of users to be searched in any particular service site, improving operational efficiency.

Another embodiment of the invention is shown with reference to FIG. 10. This embodiment may trigger connections based on proximity of a plurality of users rather than proximity of a single user to a predetermined location.

First, in step 411, server 108 is turned on or otherwise activated, and begins a continual search for candidates for automatic connections in step 412, continuing until the server is shut down or otherwise made unavailable in step 421. The loop in step 413 examines each active user who is not already party to a connection, and in step 420 restarts to reexamine them all over again per loop step 412.

The loop in step 414 takes a first selected user and examines the distance between that selected user and all other active users comprising sequentially selected second users. Step 419 selects the next second active user and continues executing loop 413.

Steps 415 to 418 perform the distance and connection operations of the automatic connection algorithm, with other steps serving largely to iterate across all active first users compared with all other active second users. Step 415 considers the current TU position for a first user from database 142 and examines the distance between that first user and the position in database 142 for the selected second user from step 414. In step 416, the distance between the selected first user and selected second user is compared to a predetermined distance threshold, for example, 50 meters. If the distance is small enough for the two users to be nearby each other according to a predetermined distance threshold, step 417 is executed to initiate an automatic telecommunication connection between the selected first user's TU and the selected second user's TU. Regardless of whether a connection is initiated, step 418 iterates the loop controlled by step 414, either trying all second users in database 142 or stopping iteration once the first user is connected. When the first user is connected, step 413 iterates to next active first user.

Using the above method, a user coming within a predetermined triggering distance to any other active user may receive a phone call or other automatic creation of a telecommunication connection. In one embodiment a single connection is created, and further connections to a particular TU 201 are not made until the current connection of any particular TU 201 is completed. In some embodiments, the user of TU 201 has the ability to select an operating mode which either enables or disables the automatic creation of connections as a matter of convenience.

In some embodiments, server 108 triggers connections not only responsive to distance, but also responsive to a filtering function based on user attribute profile information. Any relevant user attribute is possible and within scope of the invention. Moreover, for user-to-user connections it becomes relevant to have profile information related to automatic matchmaking or otherwise facilitating meetings such with respect to above aspects of the invention. For instance, instead of waiting for a user to request creation of a matchmaking connection, a matchmaking connection may be automatically instantiated when two or more compatible users are within a predefined distance, optionally only when the users have indicated that automatic matchmaking is allowed.

There are a number of alternatives that may constitute desirable embodiments in a variety of alternate situations. This list of alternative embodiments should be considered merely illustrative, and is not intended to limit the scope of the invention.

It may be desirable to further filter triggering to situations in which multiple users are close to a particular location of interest, thus combining elements of the person-to-location embodiment with the person-to-person embodiment. As an example, profile information for a user fond of coffee shops might be set to receive notification any time that user was within a preset distance of a favored coffee shop at the same time some other compatible user (or friend, as defined by the user) is also within the preset distance of that same coffee shop, thereby arranging to have coffee with a compatible person (or friend) when the opportunity presents itself. Some embodiments may perform the distance test to only one user rather than both users due to the fact that if one user is close to a location, then other nearby users must of necessity also be relatively close to the same location. Also, other nearby users may be near the distance threshold rather than strictly within it.

In some embodiments the number of users within a distance threshold may be more than two. For example, while someone looking for a chess playing companion might look for a single like-minded individual within a predetermined distance, a bridge player might desire to be connected to an emergent conference call phone conversation with three other people within a predetermined distance to arrange an ad hoc bridge game.

Also, in some embodiments the selected location may be a moving location. That is, the usually static notion of location may actually refer to a moving location. For example, the location of the umbra of a solar eclipse moves over time, so the system may notify appropriate users that they should look outside to see an eclipse when they are within the area of the umbra.

Among the many benefits of this aspect of the invention is the ability to flexibly select one or more callees in a population of TU users based on location and distance information both with respect to geographic locations and inter-user distances. This benefit enables creating ad hoc physical meetings and social occasions based on who happens to be close together at any given time as well as notifying users that they are passing near places of interest they might not have otherwise noticed.

CONNECTION BASED ON DEGREE OF SEPARATION

Figure 13:
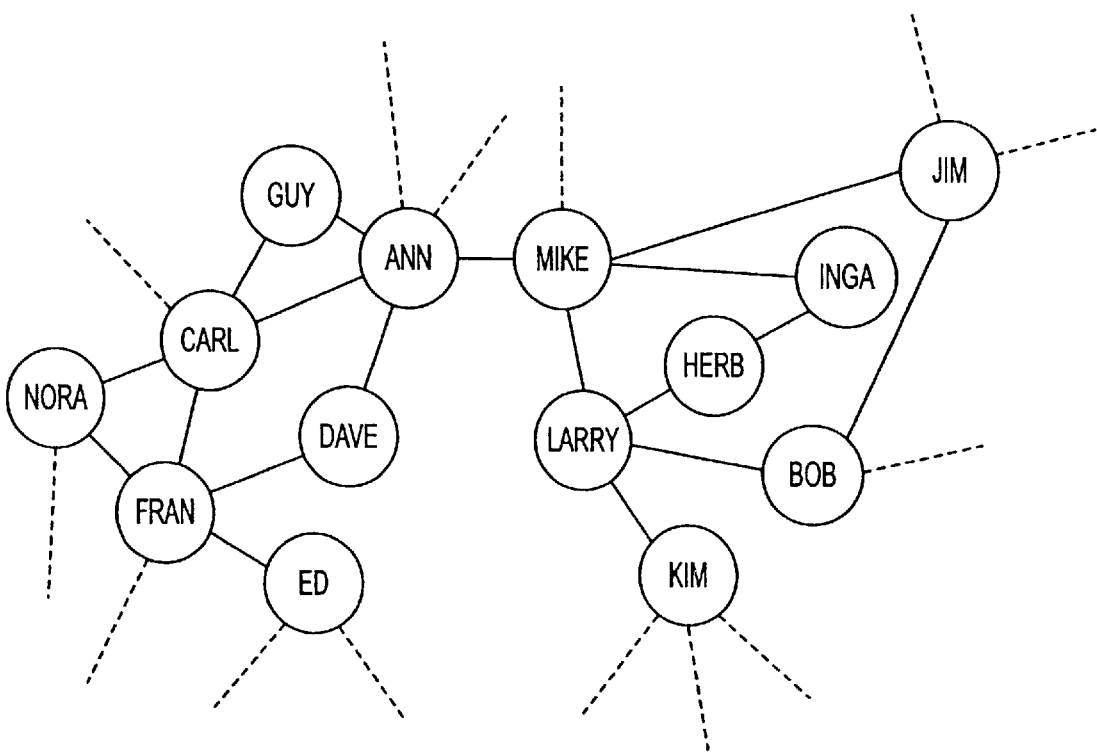
FIG. 13 illustrates an acquaintance graph.

Another aspect of the invention may connect proximately located mobile users based on the degree of separation between the users of the TUs in an acquaintance graph such as that shown in FIG. 13. Two individuals are said to be acquainted when they know each other, regardless of whether by blood, marriage, work, or otherwise. Users represented by two nodes are said to be acquainted when the nodes are connected. If two users know each other, their degree of separation is 1. If two users do not know each other but both know a particular individual (i.e., have a common friend), their degree of separation is 2. If they do not have friends in common, but each has a friend and those two friends know each other, then their degree of separation is 3, and so forth. In FIG. 13, Ann knows Carl, Dave, Guy, and Mike, thus Ann is said to be acquainted with these individuals, because they only have one degree of separation. Carl, in addition to Ann, is also acquainted with Dave, Fran, Guy, and Nora. Thus, Ann has two degrees of separation from Fran and Nora, among others.

Figure 11:
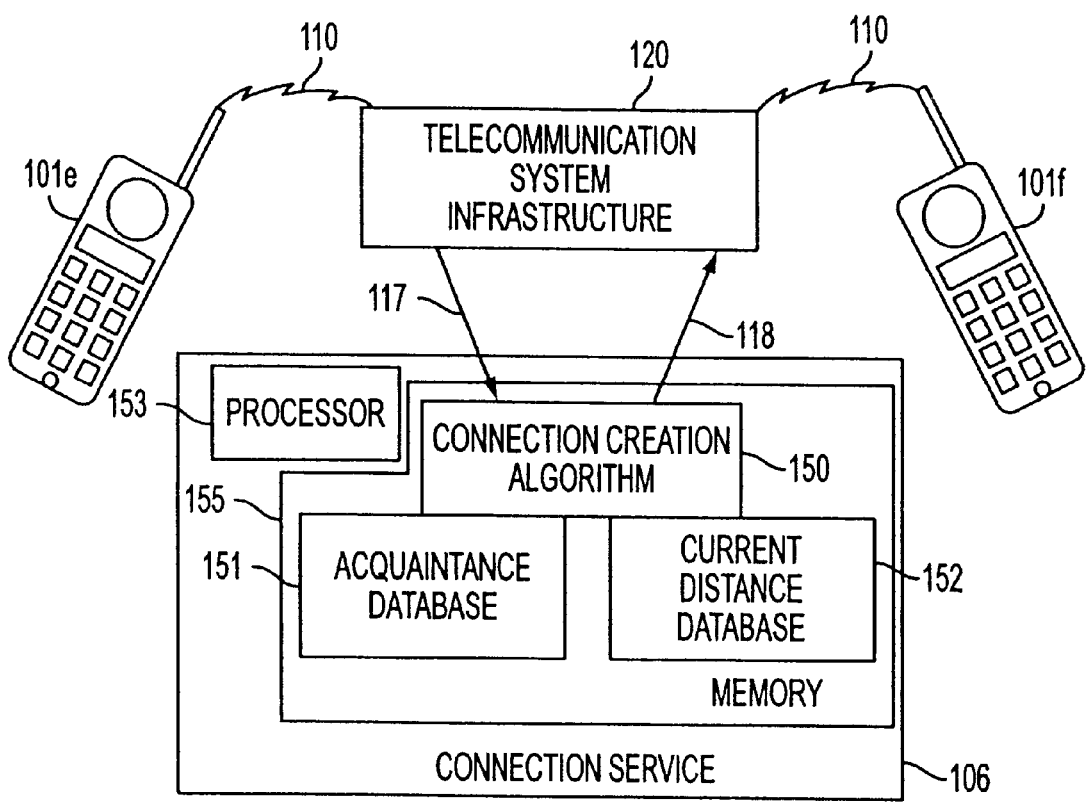
FIG. 11 illustrates a simplified telecommunication system and includes details of a connection service apparatus.

An embodiment of the invention that uses acquaintance graphs is shown in FIG. 11. A first MU 101e (or alternatively an SU 102 in another embodiment) is connected via the telecommunication infrastructure 120 to the acquaintance server 106. Infrastructure 120 sends location information about the first MU 101e to the acquaintance server 106 along telecommunication link 117. Information about the locations of all other MUs are additionally sent to acquaintance server 106 on link 117 as requested and/or as appropriate to the selection algorithm. Acquaintance server 106 further conditionally sends a request to establish connections among a plurality of selected MUs via a request for connection on link 118.

The acquaintance server 106 may comprise a processor 153 and memory 155. The memory may store one ore more connection creation algorithms 150 that uses other components stored in memory to search for a suitable match to the user of the first MU 101e. An acquaintance database 151 may contain an acquaintance graph for registered users of the service and, in one embodiment, all users about which it can obtain information. As discussed above, nodes within an acquaintance graph represent users of TUs, and an arc connecting two nodes within the acquaintance graph represents that the individuals represented by the two nodes are acquaintances. (i.e., node A and node B are joined by an arc within the acquaintance graph when person A knows person B).

Data to create the acquaintance graph may be entered by users in terms of their immediate acquaintances, and can be joined to other data received from other sources to form a single graph using various techniques as would be apparent to one skilled in the art. Acquaintance database 151 preferably also contains other information about each user represented via a node, including at a minimum that user's telephone number or other suitable contact information to be used in establishing a connection. A current distance information database 152 is able to generate distance information between any two registered users, and is preferably implemented as a database of locations plus an algorithm to compute distance between any two locations as is known in the art.

Figure 12:
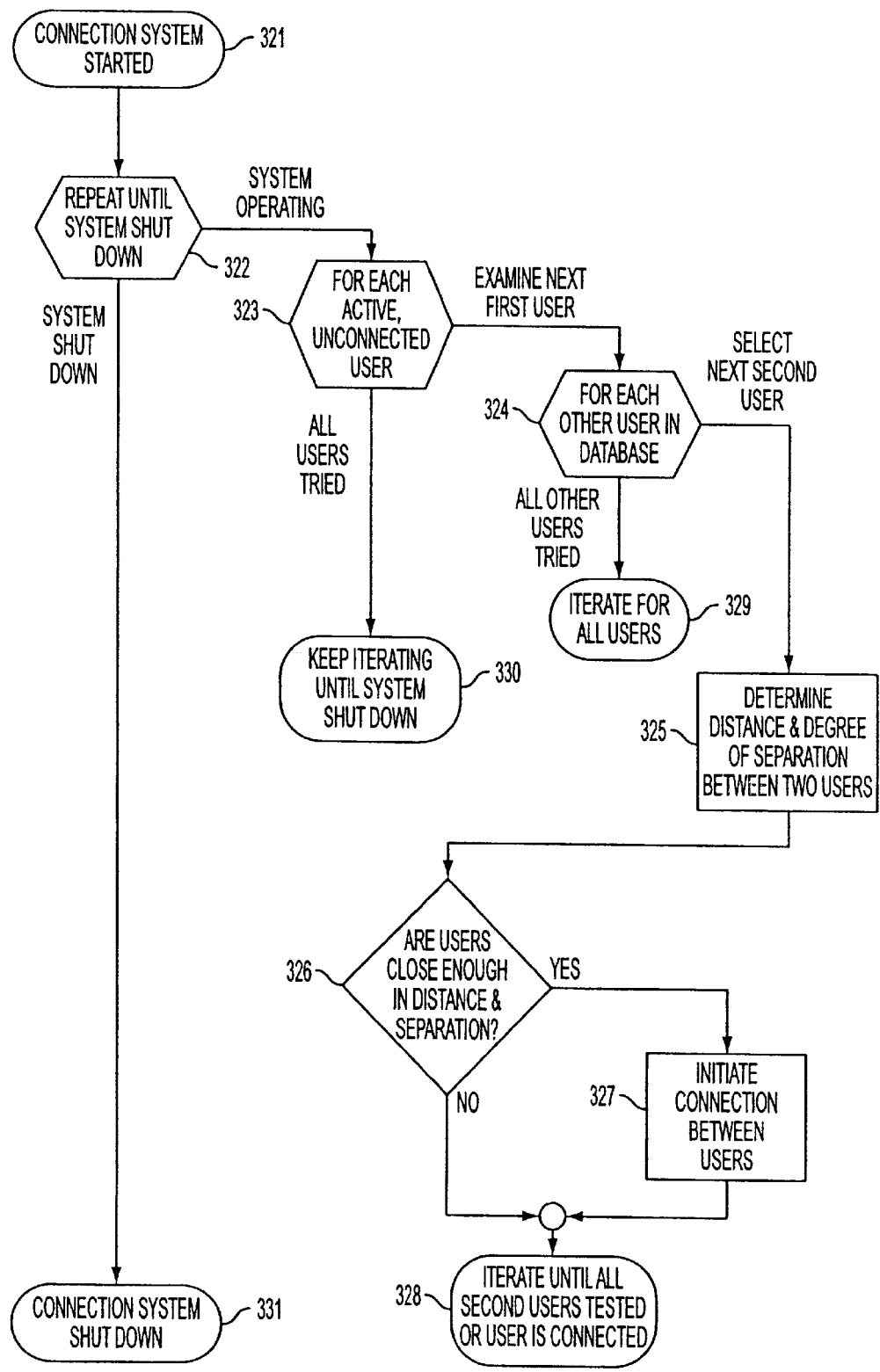
FIG. 12 illustrates a flow chart for establishing a telecommunication connection responsive to degree of separation information and distance information.

A process for automatically creating a connection is shown in FIG. 12. In this process, connections may be automatically triggered when two users having a small degree of separation are within a predetermined distance of each other. Any user desiring to participate in any connection opportunities that might arise as a result of their degree of separation from other users may activate an enabling feature on his/her MU 101, making that user an "active" user for the purposes of establishing a connection based on the acquaintance graph. Alternately a predetermined connection service telephone number can be used instead to perform activation, such as on older MUs 101 not having a special-purpose connection enabling feature. Calling such a number might not in and of itself create a connection—rather it simply implies that the user making such a call may be available for any future connection opportunities that might arise. Other known methods of opting in, such as using a built in menu in the TU, may also be used.

First, in step 321, service 106 is turned on or otherwise made available, and begins a continual search for candidates for automatic connections in step 322, continuing until the service is shut down or otherwise made unavailable in step 331. The loop in step 323 examines each first active user who is not already party to a connection, and in step 330 reiterates over all active users to reexamine them all over again per loop step 322.

The loop in step 324 takes a second active user (excepting the first active user currently already selected by loop step 323) so as to examine the distance and degree of separation between that first user and each possible second user. Step 329 selects the next second active user and continues executing loop 323.

Steps 325 to 328 perform the distance, degree of separation, and connection operations of the automatic connection algorithm, with other steps serving to iterate across all pairs of active users. Step 325 considers both the distance between the selected first and second users as well as the degree of separation between the selected first and second users obtained from acquaintance database 151. In step 326, the system compares the distance between the first and second user against a predetermined maximum threshold distance (for example, 50 meters), and also compares the degree of separation between the first and second user (for example, 2 degrees of separation, indicating that the two users have a friend in common). Other connection decision criteria are possible, including specifically the ability for users to set their own preferred distance thresholds and degree of separation thresholds, with other alternatives discussed below.

If step 326 determines that distance and degree of separation thresholds are satisfied, step 327 is executed to initiate an automatic telecommunication connection between the first and second users' TUs. Regardless of whether a connection is initiated, step 328 iterates the loop controlled by step 324, either trying all active second users or stopping iteration once users are connected.

Using the method shown in FIG. 12, any user coming within triggering distance to any other user having a sufficiently small degree of separation may receive a phone call or otherwise experience the automatic creation of a telecommunication connection with the other user involved in the triggering event. In one embodiment a single connection is created, and further connections to a particular TU 201 are not made until the current connection to that particular TU 201 is completed. Also, in one embodiment the user of TU 201 has the ability to select an operating mode that selectively enables or disables the automatic creation of connections as a matter of convenience.

There are a number of alternatives to the above embodiment that may constitute desirable embodiments in a variety of alternate situations. This list of alternative embodiments should be considered merely illustrative, and is not intended to limit the scope of the invention.

The triggering of connections in steps 325 and 326 could additionally be responsive to attribute information about the parties potentially being connected. For example, not only might two individuals have to be close to each other and have a low degree of separation, but one of the persons involved in the potential connection might have a filter set to permit connections perhaps only to people of the same religion, same demographic group, or same ethnic group. In other words, it is possible to combine the triggering techniques of this aspect of the invention with other aspects of the invention based on user attributes, above.

In some embodiments multiple graphs may be stored within the acquaintance database. Each graph may represent a specific type of connection, such as via a religious group or via a community service organization. This would provide an alternate approach to limiting which types of degrees of separation are enabled for connections, or for assigning different limits on degrees of separation for each type of graph. For example, a user wanting to generate business leads and not wishing to overly impose on friendships might enable connections for two degrees of separation for business contacts but only one degree of separation for social contacts.

In another embodiment, an alternate to the algorithm of comparing distance and separation against thresholds in step 326 may be to use a weighted threshold scheme. For example, a lookup table could be used to set a maximum allowable distance for every degree of separation. For example, a user might set 200 meters distance for one degree of separation, but only 100 meters of distance for two degrees of separation, and 10 meters of distance for three degrees of separation. A standardized such lookup table could be used, as well as a mathematical tradeoff formula used in the same manner as such a lookup table.

Another use of acquaintance graphs may be to examine multiple paths through the graph and determine the "strength" of a potential affinity via a mathematical relationship involving number and degree of separation degrees as well as distance. As an example, a formula for strength that may be used is:

$$\text{strength} = 10X + 3Y + Z \qquad \text{(Equation 1)}$$

where X represents the number of one degree paths, Y represents the number of two degree paths, and Z represents the number of three degree paths between two users. This formula computes a strength in which one-degree-of-separation paths are weighted heavier than other paths, but someone with a large number of two-degree-of-separation paths through the acquaintance graph may still score well. The weights on this formula are arbitrary and may readily be changed as appropriate for any given embodiment, including non-linear combinations. Given such a formula, a user could select a threshold strength, below which a connection might not be initiated. Additionally, this strength could be traded off against distance as taught in the preceding paragraphs, such that the farther away a potential match is from the user, the greater the strength requirement may be in order to initiate a connection.

An additional approach to evaluating distances along acquaintance graphs that may be used independently or combined with other approaches is assessing the number and length of independent paths. Two paths are said to be independent if they have no acquaintance graph nodes in common other than the two end-point nodes being used for the degree of separation assessment. This approach may give an improved assessment of distance by reducing the effect of paths having only slight variations in an otherwise shared set of hops through the graph.

The selection process of step 326 may alternately be responsive to predetermined times of day during which individual users have elected to be available or unavailable for connections. Alternately, in a further preferred embodiment, each MU 101 may have the capability to set a mode of "responsive" or "unresponsive" to connections so as to avoid connections wasted to callees who are not available for discussions. Again, this is a similar idea to turning off a cell phone when one does not want to be disturbed, but may apply only to automatic connections based on degree of separation Also, the selection algorithm comprising steps 325 and 326 may be recast in a number of ways depending on information available and the type of selection desired. This aspect of the invention may encompass any connection process responsive to both degree of separation and distance. The invention is specifically intended to cover not only connections between two individuals, but also connections involving groups of individuals with low degrees of separation and close physical proximity, using extensions to this aspect that would be evident to one skilled in the art in light of this and above aspects of the invention.

Another embodiment may be constructed and operated similar to the previous embodiment except for the contents of the acquaintance graph. Instead of the acquaintance graph containing data about who knows whom, the acquaintance graph may be replaced by genealogical data forming an ancestry tree without regard to whether any connected ancestors have met (although presumably in the majority of cases they have indeed met). The notion of degree of separation then becomes the number of "hops" (i.e., number of arc traversals) required to traverse between two family or extended family members. This may be performed to facilitate chance meetings among indirectly related people (for example, among second or third cousins who might otherwise not know each other). As an example, an American of European descent might activate such a feature while taking a vacation in Europe to foster chance meetings with distant relatives and have a topic of conversation available in the form of the genealogical relationship with whichever person is met. The maximum threshold degree of separation may be higher when using a genealogical tree instead of an acquaintance graph.

Yet another embodiment of the invention may be constructed and operated similar to the above embodiments, except for the addition of an additional triggering mechanism. In this embodiment, a first user may actively and intentionally trigger a connection to the best match currently available among all other active users.

In this embodiment, all feasible second users are examined for the best score against triggering criteria, looking for the second user having the minimum combination of distance and degree of separation. Previous discussions of possible lookup tables and mathematical approaches for generating scores may apply for this embodiment as well. This may be used as an intentional meeting generator or private "panic button" when the first user wishes to contact the most accessible friend or indirect friend available for a telecommunication connection. An example of this use might be if someone is stranded in a strange place and in need of help, or even just lonely and looking for a friend or newfound friend to share a meal with. The fact that even an immediate family member (i.e., a user with degree of genealogical separation of one) is by chance geographically close while a caller is in a strange location may be unknown and in practice unknowable to a user without the availability of this embodiment or exhaustive calling of all possible friends, acquaintances, and relatives.

A particular distinction with regard to various aspects of the above-described invention is the preferred usage by people. Prior art for generating introductions between people has virtually always focused exclusively on establishing contact between two potentially compatible people at a distance, and then letting them work out details of a meeting time and place or alternately having a mediator (a "matchmaker") make such arrangements. This severely limits the number and scope of such meetings and neglects the potentially huge numbers of opportunistic meetings that might otherwise occur when compatible, related, or otherwise acquainted people happen to be at the same place at the same time. One use of this invention may be to create a connection between two individuals who are related, work together, are potentially compatible, or are otherwise acquainted, but to additionally bypass the need to negotiate and arrange for a meeting time and place. Because the users are connected responsive to distance, the meeting time is "now" and the meeting place is approximately "right here", wherever the users happen to be. This approach may generate an entirely new class of capability for facilitating ad hoc business discussions, dates, sales opportunities, and other meetings of all sorts.

One or more embodiments may be performed by a computer storing computer readable instructions on a computer readable medium, such that when the computer readable instructions are read and executed by a processor of the computer, the computer is caused to perform in accordance with the invention as described herein.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for initiating a telecommunications connection, comprising the step of connecting a first telecommunications unit (TU) to a second TU when predetermined criteria is met, wherein the predetermined criteria comprises the first and second TUs being within a predetermined distance of each other, and a first user associated with the first TU being connected to a second user associated with the second TU in a graph representing relationships among users, wherein the predetermined distance is responsive to a degree of separation of the first and second users.

2. The method of claim 1, wherein the predetermined criteria further comprises the first user being connected to the second user with a minimum degree of strength, wherein the strength is calculated based on a number of paths in the graph between the first user and the second user.

3. The method of claim 1, wherein the first user associated with the second user is determined by a degree of separation that is weighted responsive to a number of independent paths from the first user to the second user in the graph.

4. The method of claim 1, further comprising the step of suppressing the connection when at least one of the first and second users has elected to be unavailable for connections based on graph relationships.

5. The method of claim 1, wherein the connecting step is automatically initiated when the predetermined criteria are met.

6. The method of claim 1, wherein the connecting step is performed responsive to a request by the first user, and wherein the second user is selected based on a degree of separation between the first and second users and a measure of distance between the first and second TUs.

7. A computer readable medium for storing computer readable instructions that, when executed by a processor, cause a computing device to perform a set of steps for initiating a telecommunications connection, the set of steps comprising the step of connecting a first telecommunications unit (TU) to a second TU when predetermined criteria are met, wherein the predetermined criteria comprises the first and second TUs being within a predetermined distance of each other, and a first user associated with the first TU being connected to a second user associated with the second TU in a graph representing relationships among users, wherein the predetermined distance is responsive to a degree of separation of the first and second users.

8. The computer readable medium of claim 7, wherein the predetermined criteria further comprises the first user being connected to the second user with a minimum degree of strength, wherein the strength is calculated based on a number of paths in the graph between the first user and the second user.

9. The computer readable medium of claim 7, wherein the first user associated with the second user is determined by a degree of separation that is weighted responsive to a number of independent paths from the first user to the second user in the graph.

10. The computer readable medium of claim 7, wherein the set of steps further comprise the step of suppressing the connection when at least one of the first and second users has elected to be unavailable for connections based on graph relationships.

11. The computer readable medium of claim 7, wherein the connecting step is automatically initiated when the predetermined criteria are met.

12. The computer readable medium of claim 7, wherein the connecting step is performed responsive to a request by the first user, and wherein the second user is selected based on a degree of separation between the first and second users and a measure of distance between the first and second TUs.

13. A system for initiating a telecommunications connection, comprising:
a processor;
memory for storing computer readable instructions that, when executed by the processor, cause the system to perform a set of steps, the set comprising the step of connecting a first telecommunications unit (TU) to a second TU when predetermined criteria are met, wherein the predetermined criteria comprises the first and second TUs being within a predetermined distance of each other, and a first user associated with the first TU being connected to a second user associated with the second TU in a graph representing relationships among users, wherein the predetermined distance is responsive to a degree of separation of the first and second users.

14. The system of claim 13, wherein the predetermined criteria further comprises the first user being connected to the second user with a minimum degree of strength, wherein the strength is calculated based on a number of paths in the graph between the first user and the second user.

15. The system of claim 13, wherein the first user associated with the second user is determined by a degree of separation that is weighted responsive to a number of independent paths from the first user to the second user in the graph.

16. The system of claim 13, wherein the set of steps further comprises the step of suppressing the connection when at least one of the first and second users has elected to be unavailable for connections based on graph relationships.

17. The system of claim 13, wherein the connecting step is automatically initiated when the predetermined criteria are met.

18. The system of claim 13, wherein the connecting step is performed responsive to a request by the first user, and wherein the second user is selected based on a degree of separation between the first and second users and a measure of distance between the first and second TUs.

19. A method of transmitting data to at least one of a plurality of telecommunication units (TUs), comprising:
determining a distance between a first TU and a second TU;
determining a degree of separation between a first user associated with the first TU and a second user associated with the second TU; and responsive to determinations that the first TU and the second TU are within a predetermined distance of each other and the first user and the second user are a predetermined degree of separation from each other;
transmitting data to at least one of the first and second TUs.

20. The method of claim 19, wherein at least one TU is a mobile telecommunications unit.

21. The method of claim 19, wherein the degree of separation is determined from genealogical information.

22. The method of claim 19, wherein the degree of separation is determined from acquaintance information.

23. The method of claim 19, wherein each user is associated with attribute information, and wherein the transmitting of data is responsive to an additional determination that the first user and the second user have compatible attribute information.

24. A computer readable medium for storing computer readable instructions that, when executed by a processor, cause a computing device to perform a set of steps for transmitting data to at least one of a plurality of telecommunication units (TUs), the set of steps comprising:

determining a distance between a first TU and a second TU;

determining a degree of separation between a first user associated with the first TU and a second user associated with the second TU; and responsive to determinations that the first TU and the second TU are within a predetermined distance of each other and the first user and the second user are a predetermined degree of separation from each other;

transmitting data to at least one of the first and second TUs.

25. The computer readable medium of claim 24, wherein at least one TU is a mobile telecommunications unit.

26. The computer readable medium of claim 24, wherein the degree of separation is determined from genealogical information.

27. The computer readable medium of claim 24, wherein the degree of separation is determined from acquaintance information.

28. The computer readable medium of claim 24, wherein each user is associated with attribute information, and wherein the transmitting of data is responsive to an additional determination that the first user and the second user have compatible attribute information.

29. A system for transmitting data to at least one of a plurality of telecommunication units (TUs), comprising:

a processor;

memory for storing computer readable instructions that, when executed by the processor, cause the system to perform a set of steps, the set comprising:

determining a distance between a first TU and a second TU;

determining a degree of separation between the first TU and the second TU; and responsive to determinations that the first TU and the second TU are within a predetermined distance of each other and the first user and the second user are a predetermined degree of separation from each other;

transmitting data to at least one of the first and second TUs.

30. The system of claim 29, wherein at least one TU is a mobile telecommunications unit.

31. The system of claim 29, wherein the degree of separation is determined from genealogical information.

32. The system of claim 29, wherein the degree of separation is determined from acquaintance information.

33. The system of claim 29, wherein each user is associated with attribute information, and wherein the transmitting of data is responsive to an additional determination that the first user and the second user have compatible attribute information.

* * * * *